United States Patent

Ushijima et al.

[11] Patent Number: 5,889,086
[45] Date of Patent: Mar. 30, 1999

[54] WATER REPELLENT FOR AUTOMOBILE WINDOW GLASS

[75] Inventors: Takashi Ushijima, Yokohama; Seigo Shinohara, Chigasaki, both of Japan

[73] Assignee: Taiho Industries Co., Ltd., Tokyo, Japan

[21] Appl. No.: 880,687

[22] Filed: Jun. 23, 1997

[51] Int. Cl.$^6$ .............. C09K 3/18; C08K 5/54; C08L 27/12; C08L 91/06
[52] U.S. Cl. .......... 523/169; 524/261; 524/267; 524/268; 524/269; 524/414; 524/422; 524/438; 524/487; 524/489; 524/506; 524/544; 524/545; 524/546; 524/588
[58] Field of Search ............. 523/169; 524/261, 524/267, 268, 414, 422, 438, 487, 489, 506, 544, 545, 546, 588, 269

[56] References Cited

U.S. PATENT DOCUMENTS 3,579,540  5/1971  Ohlhausen ............... 523/169
5,425,804  6/1995  Shinohara et al. ........ 523/169

FOREIGN PATENT DOCUMENTS 81799  7/1978  Japan ................. 524/269
4-363375  12/1992  Japan .

Primary Examiner—Peter A. Szekely
Attorney, Agent, or Firm—Oblon, Spivak, McClelland, Maier & Neustadt, P.C.

[57] ABSTRACT

A water repellent for automobile window glass includes dimethyl polyorganosiloxane, an inorganic acid, a water-type solvent, and at least one member selected from the group consisting of alkyl group-containing polyorganosiloxanes each having a specific structure, fluorine resins each having a specific structure, and paraffin waxes.

9 Claims, No Drawings

WATER REPELLENT FOR AUTOMOBILE WINDOW GLASS

BACKGROUND OF THE INVENTION

1. Field of the Invention

This invention relates to a water repellent for automobile window glass. More particularly, this invention relates to a water repellent for glass which prevents rain drops from adhering to automobile window glass (e.g., windshield glass) even when the automobile is traveling in the rain at a low speed of less than about 50 km/hr and allows the automobile window glass to offer a perfect field of view.

2. Description of the Prior Art

A method for preventing window glass from retaining rain drops on the surface thereof and enabling it to secure a perfect field of view in the rain by subjecting the glass surface in advance to a treatment for imparting water repellency thereto has been proposed heretofore. The treating agent which is used for this treatment is called a water-repellent type treating agent and is composed of dimethyl polyorganosiloxane, an inorganic acid, and a water-type solvent (U.S. Pat. No. 3,579,540).

The conventional water-repellent type treating agent indeed enables automobile window glass to secure a perfect field of view while the automobile is traveling at a high speed because rain drops hitting the glass surface are blown away by the pressure of wind. However, since dimethyl polyorganosiloxane exhibits strong adhesion with water molecules, rain drops adhere to the glass surface to the extent of impairing the field of view of the glass while the automobile is traveling at a low speed.

An object of this invention is to provide a water repellent for automobile window glass which prevents rain drops from adhering to the surface of automobile window glass and enables the window glass to offer a perfect field of view in the rain even while the automobile is traveling even at a low speed.

SUMMARY OF THE INVENTION

To accomplish the object mentioned above, this invention provides a water repellent for automobile window glass which comprises dimethyl polyorganosiloxane, an inorganic acid, a water-type solvent, and at least one component selected from among alkyl group-containing polyorganosiloxanes represented by the following general formulas (1), (2), and (3) (wherein $X_1$, $X_2$, and $X_3$ each represents a long-chain alkyl group), fluorine resins represented by the following general formulas (4) and (5), and paraffin waxes.

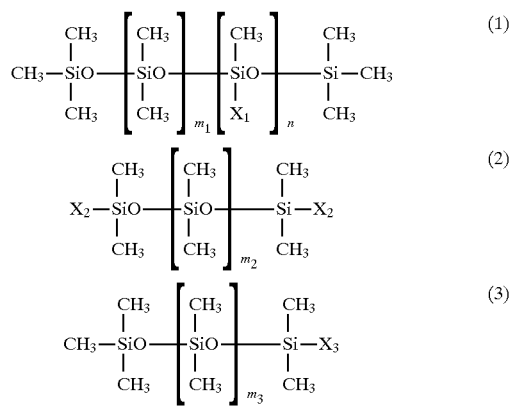

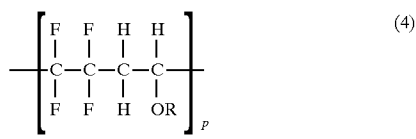

The water repellent of this invention, owing to the addition of at least one component selected from the group consisting of alkyl group-containing polyorganosiloxanes and fluorine resins of specific structures as shown above, and paraffin waxes, enables water molecules to exhibit strong surface tension, substantially prevents adhesion of rain drops to the window glass in the rain even when the automobile travels at a speed of 40–50 km, enables rain drops which happen to adhere to the glass surface to roll upward or sideways, and enables the window glass to secure a perfect field of view at all times.

The above and other objects, features, and characteristics of this invention will become apparent from the following description of preferred embodiments of this invention.

DESCRIPTION OF THE PREFERRED EMBODIMENT

The present inventors made various studies with a view to minimizing the adhesion which dimethyl polyorganosiloxane used in the conventional water-repellent type treating agent manifests with water molecules and consequently found that a decrease in the adhesion to the water molecules is attained by adding to the composition of the conventional water-repellent type treating agent at least one component selected from among alkyl group-containing polyorganosiloxanes and fluorine resins of specific structures, and paraffin waxes. This invention has been perfected as a result.

Specifically, the water repellent according to the present invention is obtained by adding at least one component selected from among alkyl group-containing polyorganosiloxanes and fluorine resins of specific structures, and paraffin waxes to a water-repellent composition comprising dimethyl polyorgano-siloxane as a water-repellent component, an inorganic acid for adjusting an acidity, and a water-type solvent for dissolving these components.

The dimethyl polyorganosiloxane used in this invention is preferred to have viscosity in the range of 5–500 cst. If this viscosity is less than 5 cst, the compound will not adhere strongly to glass and will therefore not produce fully satisfactory water-repelling effect. If the viscosity exceeds 500 cst, the compound will not easily dissolve in the water-type solvent.

The amount of dimethyl polyorganosiloxane added is in the range of 2–30% by weight, preferably 5–20% by weight, based on the total weight of the water repellent. If this amount is less than 2% by weight, the water-repelling effect obtained may not be fully satisfactory. Conversely, if the amount exceeds 30% by weight, the water repellent applied to a glass surface leaves a condensate after evaporation of the solvent. This makes it difficult to form a uniform clear water-repellent film on the glass surface.

Preferred examples of the inorganic acid used in this invention include sulfuric acid, and phosphoric acid. These acids may be used either singly or in combination.

The water-type solvents usable in this invention are alcohols having 1 to 5 carbon atoms such as ethyl alcohol, isopropyl alcohol, methyl alcohol, normal propyl alcohol, and butyl alcohol.

The alkyl group-containing polyorganosiloxanes used in this invention are those which have such structures as represented by the following general formulas (1), (2), and (3) and which assume a solid state at normal room temperature. In the formulas, $X_1$, $X_2$, and $X_3$ each represents a long-chain alkyl group, $m_1$, $m_2$ and $m_3$ each represents an integer in the range of 10–500, and n represents an integer in the range of 1–5. The alkyl groups have a number of carbon atoms falling in the range of 10–50, preferably 10–35.

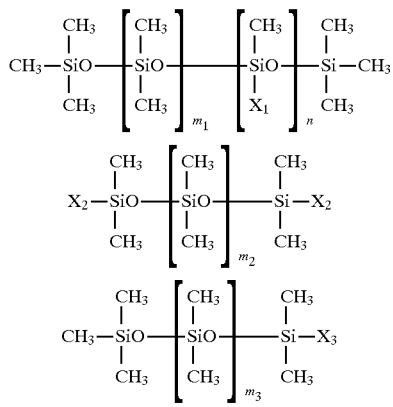

The amount of the alkyl group-containing polyorganosiloxane added is only required to be in the range of 0.01–10% by weight, preferably 0.1–3.0% by weight, based on the total weight of the water repellent. If this amount is less than 0.01% by weight, the desired effect may not be fully manifested. Conversely, if this amount exceeds 10% by weight, the excess prevents the dimethyl polyorganosiloxane from exhibiting water-repelling effect and impairs the water repellency of the product.

Fluorine resins of structures represented by the following general formulas (4) and (5) can be preferably used in this invention. In the formulas, p represents an integer in the range of 500–1500, and q represents an integer in the range of 4–7.

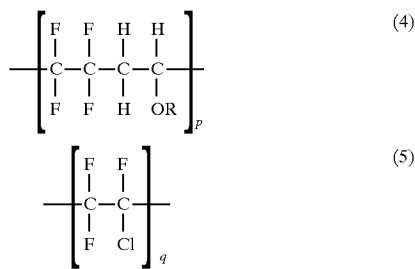

The fluorine resins of the formula (4) are fluoro-olefin vinyl ether type copolymers and exhibit preferable solubility in a water-type solvent. The fluorine resins of the formula (5) are low polymers of ethylene trifluorochloride and exhibit preferable solubility in a water-type solvent.

The amount of the fluorine resin used is in the range of 0.01–10% by weight, preferably 0.1–3.0% by weight, based on the total weight of the water repellent. If this amount is less than 0.01% by weight, the effect obtained may not be fully satisfactory. Conversely, if the amount exceeds 10% by weight, the excess prevents the dimethyl polyorganosiloxane from exhibiting water-repelling effect and impairs the water repellency of the product.

The paraffin waxes for use in this invention are preferred to have melting points exceeding 50° C. They are of the type used for mold releases or hotmelts.

The amount of the paraffin wax used is in the range of 0.01–10% by weight, preferably 0.1–3.0% by weight, based on the total weight of the water repellent. If this amount is less than 0.01% by weight, the effect obtained may not be fully satisfactory. Conversely, if the amount exceeds 10% by weight, the excess prevents the dimethyl polyorganosiloxane from exhibiting water-repelling effect and impairs the water repellency of the product.

When two or three components selected from the group consisting of alkyl group-containing polyorganosiloxanes, fluorine resins, and paraffin waxes mentioned above are added, the total amount of the added components is preferred to be in the range of 0.01–10% by weight, based on the total weight of the water repellent.

The alkyl group-containing polyorganosiloxanes, fluorine resins, and paraffin waxes mentioned above are slightly different in nature from one another and are slightly different in stability in the water-type solvent. A polyorganosiloxane crystallizes by precipitation. However, it shows relatively fair redispersibility because the crystals are minute particles. A fluorine resin dissolves and forms a clear solution in the water-type solvent. A paraffin wax is low in redispersibility because it forms coarse crystals by precipitation.

No conspicuous difference in the water-repelling property is observed among the three components. When only one component is used, when two components are used, or when three components are used, the water-repelling effect is observed more prominently than when none of such components is used, namely, when the conventional dimethyl polyorganosiloxane alone is used.

The method for the manufacture of the water repellent of this invention will now be explained.

First, dimethyl polyorganosiloxane and an alkyl group-containing polyorganosiloxane or a paraffin wax added in a prescribed amount thereto are stirred together and heated to a temperature in the range of 90°–120° C. and the resultant mixture is left to cool spontaneously. Separately, a water-type solvent and an inorganic acid added in a prescribed amount thereto are thoroughly stirred together. This stirring is continued after addition of the cooled mixed solution of dimethyl polyorganosiloxane and an alkyl group-containing polyorganosiloxane or paraffin wax until thorough dispersion.

Alternatively, a fluorine resin is dissolved in a prescribed amount in a water-type solvent. Then, the resultant solution and dimethyl polyorganosiloxane and an inorganic acid added thereto are stirred together until thorough solution.

When two components or three components selected from the group consisting of alkyl group-containing polyorganosiloxanes, fluorine resins, and paraffin waxes are added, dimethyl polyorganosiloxane and an alkyl group-containing polyorganosiloxane and/or a paraffin wax added in prescribed amounts thereto are heated and thoroughly stirred together. The resultant mixture is left to cool.

Separately, a prescribed amount of a fluorine resin is dissolved in a water-type solvent. The resultant solution and an inorganic acid added thereto are together stirred. Finally, the produced mixture and the cooled mixed solution added thereto are thoroughly stirred together.

A sponge, a cloth, or a piece of paper impregnated with the water repellent obtained as described above is used to apply the water repellent to the surface of automobile window glass requiring water repellency. The applied layer of the water repellent is left to dry. When the water repellent dries, a thin white film is formed on the glass surface. The treatment is completed by wiping this white film with a damp cloth or sponge until the glass becomes transparent.

Instead of applying the water repellent with a sponge or the like, the water repellent may be applied to the glass surface by spraying and then spread with a sponge or a cloth.

When water drops fall onto the glass surface treated with the water repellent of this invention as described above, they disperse on the glass surface into smaller water drops each consisting of a plurality of minute instable beads resembling spheres and having a small contact area. When the glass plate is tilted to an angle of about 30 degrees, the water drops assume a spherical shape and roll off. In the case of automobile window glass (e.g., a windshield), which generally slopes at an angle greater than 45 degrees, therefore, almost no water drops adhere to the glass surface. Even when water drops collide against the window glass, they disperse into smaller water beads. When even a weak wind blows on the window glass, i.e. when the automobile is traveling at a low speed, these water drops roll upward or sideways. Thus, the water repellent on the glass surface enables the window glass to offer a perfect field of view.

In the case of automobile window glass treated with the conventional water repellent, when the automobile is traveling at a high speed, the rain drops colliding against the window glass are dispersed into smaller water drops by the impact of the collision. Because the force of wind is large, these water drops immediately begin to roll upward notwithstanding that the water drops are small and the areas of the water drops receiving the force of the wind are proportionately small. When the automobile is traveling at a low speed and the force of the wind is small, the water drops resulting from the dispersion on the window glass and having a small area for contact with the wind move slowly on the glass surface and merge with other water drops into gradually enlarging water drops. Although these water drops encounter gradually increasing wind pressure as they grow larger, they do not begin to roll upward until the pressure of wind exceeds the adhesion of the water drops to the glass.

Since the window glass treated with the water repellent of this invention has smaller adhesion to water drops than the window glass treated with the conventional water repellent, it requires a smaller wind force for moving the water drops upward. The window glass treated with the invention water repellent secures a perfect field of view because it enables the water drops to start rolling upward even when they are still fairly small and their areas have not yet enlarged as described above.

Further, the window glass treated with the invention water repellent also repels adhesion of dirt, insects, and oil. When they happen to adhere to the window glass, they can be easily removed by the use of a wiper.

Working examples of this invention and comparative examples will now be set out. It should be noted that this invention is not limited to these working examples.

EXAMPLE 1

Ten (10.0) parts by weight of dimethyl polyorganosiloxane having a viscosity of 50 cst (TSF451, product of Toshiba Silicone K.K., Japan) and 0.1 part by weight of an alkyl group-containing polyorganosiloxane of the structural formula (2) (the number of carbons of $X_2$ being 18) were stirred together and heated to about 90° C. The resultant hot mixture was left to cool spontaneously.

Separately, 87.9 parts by weight of ethyl alcohol of an assay of 99.5% (Kokusan Kagaku K.K., Japan) and 2.0 parts by weight of sulfuric acid (Kokusan Kagaku K.K., Japan) were stirred together. The resultant mixture and 10.1 parts by weight of the mixed solution first prepared and left to cool were thoroughly stirred together to produce a water repellent.

EXAMPLE 2

A water repellent was produced by following the procedure of EXAMPLE 1 while changing the amount of the alkyl group-containing polyorganosiloxane added to 1.0 part by weight.

EXAMPLE 3

A water repellent was produced by following the procedure of Example 1 while adding 0.1 part by weight of an alkyl group-containing polyorganosiloxane of the structural formula (1) (the number of carbons of $X_1$ being 28–32) as an alkyl group-containing polyorganosiloxane.

EXAMPLE 4

A water repellent was produced by following the procedure of Example 3 while changing the amount of the alkyl group-containing polyorganosiloxane of Example 3 to 1.0 part by weight.

EXAMPLE 5

A water repellent was produced by following the procedure of Example 1 while adding 0.1 part by weight of an alkyl group-containing polyorganosiloxane of the structural formula (3) (the number of carbons of $X_3$ being 20–30) as an alkyl group-containing polyorganosiloxane.

EXAMPLE 6

A water repellent was produced by following the procedure of Example 5 while changing the amount of the alkyl group-containing polyorganosiloxane of Example 5 to 1.0 part by weight.

EXAMPLE 7

A water repellent was produced by following the procedure of Example 1 while using dimethyl polyorganosiloxane having a viscosity of 10 cst (Toshiba Silicone K.K., Japan) as dimethyl polyorganosiloxane.

EXAMPLE 8

A water repellent was produced by following the procedure of Example 1 while using dimethyl polyorganosiloxane having a viscosity of 300 cst (Toshiba Silicone K.K., Japan) as dimethyl polyorganosiloxane.

EXAMPLE 9

A water repellent was produced by following the procedure of Example 1 while using methyl alcohol (Kokusai Kagaku K.K., Japan) in the place of ethyl alcohol as a water-type solvent.

EXAMPLE 10

A water repellent was produced by following the procedure of Example 1 while using isopropyl alcohol (Kokusai Kagaku K.K., Japan) in the place of ethyl alcohol as a water-type solvent.

EXAMPLE 11

Ten (10.0) parts by weight of dimethyl polyorganosiloxane having a viscosity of 50 cst (TSF451) and 0.1 part by weight of a mold release grade paraffin wax (Weissent-T40, product of Nippon Seiro K.K., Japan) were stirred together and heated to about 120° C. The resultant hot mixture was left to cool spontaneously.

Separately, 87.9 parts by weight of ethyl alcohol of an assay of 99.5% and 2.0 parts by weight of sulfuric acid were stirred together. The resultant mixture and 10.1 parts by weight of the mixed solution first prepared and left to cool were thoroughly stirred together to produce a water repellent.

EXAMPLE 12

A water repellent was produced by following the procedure of Example 11 while changing the amount of paraffin wax added in Example 11 to 1.0 part by weight.

EXAMPLE 13

A water repellent was produced by following the procedure of Example 11 while using 0.1 part by weight of a hotmelt quality paraffin wax having a melting point of not lower than 50° C. (Ozoace-0280, product of Nippon Seiro K.K.) in the place of the paraffin wax used in Example 11.

EXAMPLE 14

A water repellent was produced by following the procedure of Example 11 while changing the amount of the paraffin wax used in Example 13 to 1.0 part by weight.

EXAMPLE 15

A water repellent was produced by dissolving 0.2 part by weight of a fluorine resin of the structural formula (4) (Lumiflon LF600, product of Asahi Glass Co., Ltd., Japan) in 87.8 parts by weight of isopropyl alcohol, then stirring the resultant solution together with 2.0 parts by weight of sulfuric acid and subsequently stirring the produced mixture together with 10.0 parts by weight of dimethyl polyorganosiloxane having a viscosity of 50 cst (TSF451).

EXAMPLE 16

A water repellent was produced by following the procedure of Example 15 while changing the amount of the fluorine resin used in Example 15 to 1.0 part by weight.

EXAMPLE 17

A water repellent was produced by following the procedure of Example 15 while using 0.2 part by weight of a fluorine resin of the structural formula (5) (Daifloyl #1, product of Daikin Kogyo K.K., Japan) in the place of the fluorine resin of Example 15.

EXAMPLE 18

A water repellent was produced by following the procedure of Example 15 while changing the amount of the fluorine resin used in Example 17 to 1.0 part by weight.

EXAMPLE 19

Ten (10.0) parts by weight of dimethyl polyorganosiloxane having a viscosity of 50 cst (TSF451), 0.1 part by weight of an alkyl group-containing polyorganosiloxane of the structural formula (2) (the number of carbon atoms of $X_2$ being 18), and 0.1 part by weight of a mold release grade paraffin wax (Weissen-T40) were stirred together and heated to about 120° C. The resultant hot mixture was left to cool spontaneously.

Separately, 87.8 parts by weight of ethanol of an assay of 99.5% and 2.0 parts by weight of sulfuric acid were stirred together. The resultant mixture and 10.2 parts by weight of the mixed solution first prepared and left to cool were thoroughly stirred together to produce a water repellent.

EXAMPLE 20

Ten (10.0) parts by weight of dimethyl polyorganosiloxane having a viscosity of 50 cst (TSF451) and 0.1 part by weight of an alkyl group-containing polyorganosiloxane of the structural formula (2) (the number of carbon atoms of $X_2$ being 18) were stirred together and heated to 90° C. The resultant hot mixture was left to cool spontaneously.

Separately, 0.2 part by weight of a fluorine resin of the structural formula (4) (Lumiflon LF600) was dissolved in 87.7 parts by weight of isopropyl alcohol. The resultant solution and 2.0 parts by weight of sulfuric acid were stirred together. The produced mixture and 10.1 parts by weight of the mixed solution first prepared and left to cool were thoroughly stirred together to produce a water repellent.

EXAMPLE 21

Ten (10.0) parts by weight of dimethyl polyorganosiloxane having a viscosity of 50 cst (TSF451) and 0.1 part by weight of a mold release grade paraffin wax (Weissen-T40) were stirred together and heated to 120° C. The resultant hot mixture was left to cool spontaneously.

Separately, 0.2 part by weight of a fluorine resin of the structural formula (4) (Lumiflon LF600) was dissolved in 87.7 parts by weight of isopropyl alcohol. The resultant solution and 2.0 parts by weight of sulfuric acid were stirred together. The produced mixture and 10.1 parts by weight of the mixed solution first prepared and left to cool were thoroughly stirred together to produce a water repellent.

Comparative Example 1

A sample solution was obtained by following the procedure of Example 1 while omitting the addition of the alkyl group-containing polyorganosiloxane.

Comparative Example 2

A sample solution was obtained by following the procedure of Example 1 while changing the amount of the alkyl group-containing polyorganosiloxane added to 0.005 part by weight.

Comparative Example 3

A sample solution was obtained by following the procedure of Example 1 while changing the amount of the alkyl group-containing polyorganosiloxane added to 15.0 parts by weight.

Comparative Example 4

A sample solution was obtained by following the procedure of Example 7 while omitting the addition of the alkyl group-containing polyorganosiloxane of Example 7.

Comparative Example 5

A sample solution was obtained by following the procedure of Example 8 while omitting the addition of the alkyl group-containing polyorganosiloxane of Example 8.

Comparative Example 6

A sample solution was obtained by following the procedure of Example 9 while omitting the addition of the alkyl group-containing polyorganosiloxane of Example 9.

Comparative Example 7

A sample solution was obtained by following the procedure of Example 10 while omitting the addition of the alkyl group-containing polyorganosiloxane of Example 10.

The water repellents of Example s 1–21 and the sample solutions of Comparative Example s 1–7 were each impregnated into folded tissue papers, applied to the entire surface of a glass plate, 20 cm×30 cm, and then left standing at room temperature for 10 minutes to dry. They all formed a white film on the glass surface.

The film was wiped with a cloth which had been wetted with water and then wrung thoroughly until the glass became transparent.

The 21 glass plates treated with the water repellents and the 7 glass plates treated with the sample solutions as described above were tilted to an angle of about 30 degrees. Fine water drops were allowed to fall onto the tilted glass plates and wind was blown at about 8 meters per second (equivalent to about 30 km per hour) from the horizontal direction onto the tilted glass plates. The behavior of the water drops on the glass plates were visually observed and the water repellents and the sample solutions were rated for water repelling effect on a four-point scale as follows. The results are as shown in the following table.

⊚: Water drops adhering to glass surface, though somewhat small, began to roll upward at a high speed.

○: Water drops adhering to glass surface, though somewhat small, began to roll upward though at a low speed.

Δ: Water drops adhering to glass surface did not begin to roll upward until they grew to a certain size.

×: Water drops adhering to glass surface gradually grew in size and ultimately rolled downward.

TABLE

| Example No. | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| Rate | ⊚ | ⊚ | ⊚ | ⊚ | ⊚ | ⊚ | ⊚ | ⊚ | ⊚ | ⊚ | ⊚ | ⊚ | ○ | ○ | ⊚ | ⊚ | ○ | ○ | ⊚ | ⊚ | ⊚ |

| Comparative Example No. | 1 | 2 | 3 | 4 | 5 | 6 | 7 |
|---|---|---|---|---|---|---|---|
| Rate | Δ | Δ | X | Δ | Δ | Δ | Δ |

What is claimed is:

1. A water repellant for automobile window glass comprising 5 to 20% by weight of a dimethyl polyorganosiloxane having a viscosity in the range of 5–500 cst, an organic acid, an alcohol having 1–5 carbon atoms, and 0.01 to 10% by weight of at least one member of the group consisting of alkyl group-containing polyorganosiloxanes represented by the following general formulas (1), (2), and (3) (wherein $X_1$, $X_2$, and $X_3$ each represents an alkyl group having 10–50 carbon atoms), fluorine resins represented by the following formulas (4) and (5), and paraffin waxes having a melting point of not lower than 50° C.

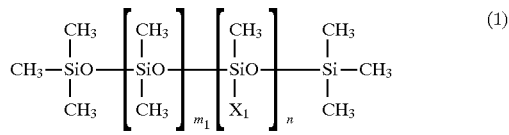

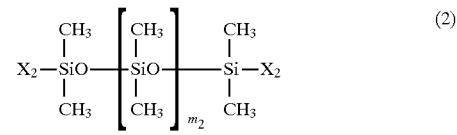

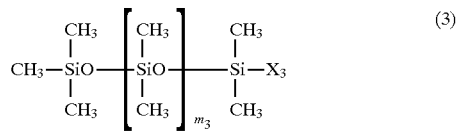

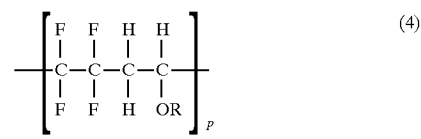

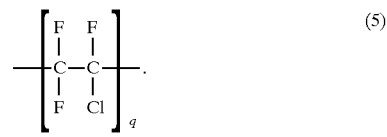

2. A water repellent according to claim 1, wherein the total amount of said alkyl group-containing polyorganosiloxanes, fluorine resins, and paraffin waxes to be added is in the range of 0.1–3.0% by weight, based on the total weight of the water repellent.

3. A water repellant for automobile window glass comprising 5 to 20% by weight of dimethyl polyorganosiloxane having a viscosity in the range of 5–500 cst, an inorganic acid, an alcohol having 1–5 carbon atoms, and 0.01 to 10% by weight of at least one member of the group consisting of alkyl group-containing polyorganosiloxanes represented by the following general formulas (1), (2), and (3) (wherein $X_1$, $X_2$, and $X_3$ each represents an alkyl group having 10–50 carbon atoms

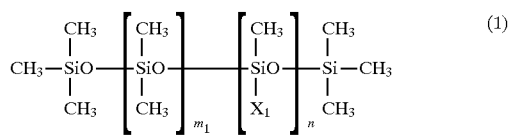

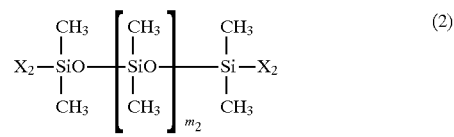

-continued

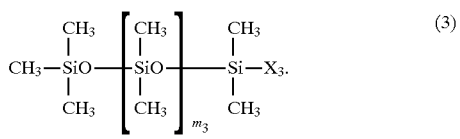
(3)

4. A water repellent according to claim 3, wherein the total amount of said alkyl group-containing polyorganosiloxane of formulas (1), (2) and (3) is in the range of 0.1 to 3.0% by weight, based on the total weight of the water repellent.

5. A water repellant for automobile window glass comprising 5 to 20% by weight of a dimethyl polyorganosiloxane having a viscosity in the range of 5–500 cst, an inorganic acid, an alcohol having 1–5 carbon atoms, and 0.01 to 10% by weight of a fluorine resin.

6. A water repellent according to claim 5, wherein said fluorine resin is selected from among the fluorine resins represented by the following general formulas (4) and (5)

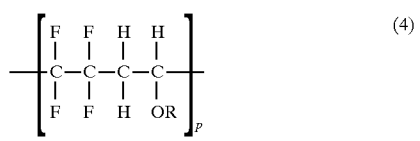
(4)

-continued

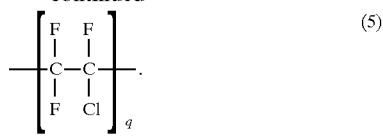
(5)

7. A water repellent according to claim 5, wherein the amount of said fluorine resin added is in the range of 0.1–3.0% by weight, based on the total weight of the water repellent.

8. A water repellant for automobile window glass comprising 5 to 20% by weight of a dimethyl polyorganosiloxane having a viscosity in the range of 5–500 cst, an inorganic acid, an alcohol having 1–5 carbon atoms, and 0.01 to 10% by weight of a paraffin wax having a melting point of not lower than 50° C.

9. A water repellent according to claim 8, wherein the amount of said paraffin wax added is in the range of 0.1–3.0% by weight, based on the total weight of the water repellent.

* * * * *

UNITED STATES PATENT AND TRADEMARK OFFICE
CERTIFICATE OF CORRECTION

PATENT NO. : 5,889,086

DATED      : MARCH 30, 1999

INVENTOR(S): TAKASHI USHIJIMA ET AL

It is certified that an error appears in the above-identified patent and that said Letters Patent is hereby corrected as shown below:

Column 9, line 59, "organic" should read --inorganic--.

Signed and Sealed this

Twelfth Day of December, 2000

Attest:

Q. TODD DICKINSON

*Attesting Officer*       *Director of Patents and Trademarks*